United States Patent
Kleidermacher

(10) Patent No.: US 9,503,898 B2
(45) Date of Patent: Nov. 22, 2016

(54) HYBRID MOBILE DEVICE AND RADIO SYSTEM

(71) Applicant: Green Hills Software, Inc., Santa Barbara, CA (US)

(72) Inventor: David Noah Kleidermacher, Santa Barbara, CA (US)

(73) Assignee: Green Hills Software, Inc., Santa Barbara, CA (US)

( * ) Notice: Subject to any disclaimer, the term of this patent is extended or adjusted under 35 U.S.C. 154(b) by 0 days.

(21) Appl. No.: 14/305,725

(22) Filed: Jun. 16, 2014

(65) Prior Publication Data

US 2015/0365233 A1    Dec. 17, 2015

(51) Int. Cl.
| | |
|---|---|
| *G06F 21/00* | (2013.01) |
| *H04W 12/08* | (2009.01) |
| *G06F 21/86* | (2013.01) |
| *G06F 21/87* | (2013.01) |
| *H04L 9/10* | (2006.01) |
| *H04L 9/08* | (2006.01) |
| *G06F 21/53* | (2013.01) |
| *H04W 4/10* | (2009.01) |
| *H04L 29/06* | (2006.01) |

(52) U.S. Cl.
CPC .............. *H04W 12/08* (2013.01); *G06F 21/53* (2013.01); *G06F 21/86* (2013.01); *G06F 21/87* (2013.01); *H04L 9/0877* (2013.01); *H04L 9/10* (2013.01); *H04L 63/105* (2013.01); *H04W 4/10* (2013.01); *G06F 2221/2107* (2013.01); *G06F 2221/2149* (2013.01); *H04L 63/0428* (2013.01)

(58) Field of Classification Search
CPC ......... G06F 21/86; G06F 21/87; H04L 9/10; H04L 9/12; H04L 9/00; H04L 9/0877
See application file for complete search history.

(56) References Cited

U.S. PATENT DOCUMENTS

| | | | |
|---|---|---|---|
| 2005/0108382 A1* | 5/2005 | Murotake | H04L 41/0233 709/223 |
| 2009/0023414 A1* | 1/2009 | Zimmer | H04W 88/06 455/323 |
| 2013/0324189 A1* | 12/2013 | Katis | H04B 1/3888 455/553.1 |
| 2014/0087722 A1* | 3/2014 | Brittain | H04W 88/06 455/426.1 |
| 2015/0052616 A1* | 2/2015 | Hutchison | G06F 21/53 726/27 |

* cited by examiner

*Primary Examiner* — Edward Zee
(74) *Attorney, Agent, or Firm* — Barcelo, Harrison & Walker LLP

(57) ABSTRACT

Certain embodiments disclose an integrated dual-device architecture for marrying modern computing devices (e.g. laptops, smartphones and tablets) with standalone tactical radios (e.g. military or first-responder push-to-talk radios) with the goal of leveraging modern mobile devices for improved interfaces and usability (compared to a tactical radio) while reducing the footprint (size, weight, battery power/capacity, and cost) of the tactical radio. Certain embodiments encompass offloading various traditional radio workloads (e.g. voice processing, control/management processing, and cryptographic processing) from the radio onto the mobile device, dramatically simplifying the tactical radio design and cost (e.g. making the radio a "dumb" transceiver only), and physically conjoining the mobile device with the reduced tactical radio into a single, conveniently operated and transported system.

69 Claims, 10 Drawing Sheets

HYBRID MOBILE DEVICE AND RADIO SYSTEM

BACKGROUND OF THE DISCLOSURE

1. Field of the Disclosure

This disclosure generally relates to an integrated dual-device architecture for marrying modern computing devices (e.g. laptops, smartphones and tablets) with standalone tactical radios (e.g. military or first-responder push-to-talk radios).

2. General Background

After many years of development and well-publicized budget overruns, the DoD's Joint Tactical Radio System program (since reorganized and renamed) has recently given birth to a set of handheld voice and data radios, so-called Rifleman radios, built by a number of traditional military radio firms, including Exelis, GD, Harris, and Thales.

Here are some key differences between a Rifleman radio and a modern smartphone:

| | Rifleman Radio | Smartphone |
|---|---|---|
| Modern Graphical Interface and Apps | No | Yes |
| Wireless Speed | 1 Mbit/s | 100 Mbit/s |
| Application Microprocessor Speeds | Up to 800 MHz | 2+ GHz |
| NSA Type-1 Cryptographic Certification | Yes | No |
| Approximate Per-Unit Cost | $5,000 | $500 |
| Can Speak DoD Tactical Waveforms | Yes | No |

Because of their scale, smartphones outpace tactical radios in processing power by a significant margin and at significantly lower production cost. Yet tactical radios require custom radio hardware and software for military environments that would never be of interest to smartphone manufacturers. Rifleman and its associated waveforms were designed strictly for a military combat environment, where robust push-to-talk voice operation is by far the highest priority.

Tactical radios typically employ specialized hardware and software radio technologies that are incompatible with modern mobile devices. For example, a smartphone may communicate over Wi-Fi or LTE networks, whereas a tactical radio may use specialized "waveforms" (such as P25 and TETRA in civil government use or Soldier Radio Waveform—SRW—in military use). Tactical radios are also focused on push-to-talk voice communications and often lack the sophisticated graphical user environment and applications found on modern mobile devices. Nevertheless, the users of tactical radios could gain significant value from leveraging such interfaces. For example, the availability of modern graphical mapping and navigational applications within a handheld tactical radio could dramatically improve warfighter effectiveness.

Nevertheless, the advent of smartphones has driven military leadership to consider how best to utilize them. Powerful graphical environments have enabled a new generation of situational awareness applications, but the mobile devices' relatively weak security and inability to communicate on resilient military networks prevent them from being used directly for tactical communications. Instead, smartphones must be tethered to rifleman radios, using the radio's USB data port for sending maps and other data, but still relying on the radio itself for voice input, encryption, and link-layer transceiving.

At an order of magnitude higher in price than a smartphone, governments do not have the budget to enable all field personnel with tactical radios. Today, tactical radio possession ends at the platoon, or at best, squad leader, leaving other team members devoid of the valuable capability.

As shown in FIG. 1, a typical tactical radio and commercial smartphone could be minimally conjoined to leverage the smartphone interfaces in a tactical environment. For example, a USB cable or other wired connector 130 could be placed between the smartphone 120 and tactical radio 110, enabling data from the smartphone to be transmitted across the tactical network. However, this approach fails to reduce size, weight, power, and cost of the tactical radio. Voice functions may be inefficiently duplicated between the two systems. Two bulky devices and the associated cabling between them encumber a user.

BRIEF DESCRIPTION OF THE DRAWINGS

By way of example, reference will now be made to the accompanying drawings.

DETAILED DESCRIPTION

Figure 1:
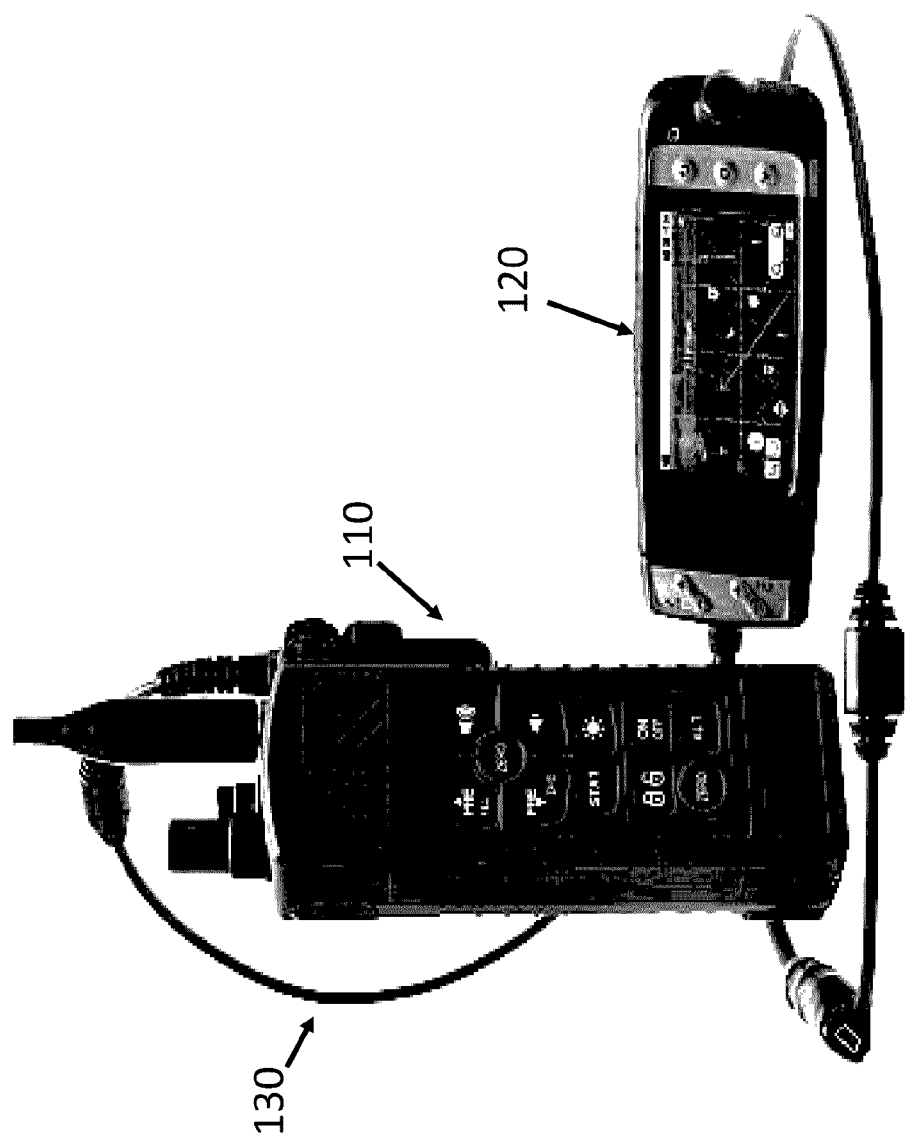
FIG. 1 illustrates a mobile device tethered to a tactical radio in accordance with certain embodiments.

While it may be technically possible to add tactical radio technology to modern smartphones (e.g. by adding additional tactical radio hardware components into their designs) or to add sophisticated mobile technology (e.g. popular mobile operating systems, application stores, and applications) to tactical radios, the combination of these two worlds is often not feasible, due to the extreme difference in target market, development cycles, and cost. This invention, therefore, seeks to leverage existing mobile devices (whose designs cannot typically be affected by the relatively small market of tactical radios) both for their improved interfaces and software environments as well as for their processing power, to offload tactical radio functionality in order to reduce the radio's cost and make it more suitable for the conjoined pairing proposed in this disclosure.

Certain embodiments involve an integrated dual-device architecture for marrying modern mobile devices (e.g. laptops, smartphones and tablets) with standalone tactical radios (e.g. military or first-responder push-to-talk radios) with the goal of leveraging modern mobile devices for improved interfaces and usability (compared to a tactical radio) while reducing the footprint (size, weight, battery power/capacity, and cost) of the tactical radio. The disclosure encompasses the offloading of various traditional radio workloads (e.g. voice processing, control/management processing, and cryptographic processing) from the radio onto the mobile device, dramatically simplifying the tactical radio design and cost (e.g. making the radio a "dumb" transceiver only), and physically conjoining the mobile device with the reduced tactical radio into a single, conveniently operated and transported system.

In certain embodiments, a next generation mobile tactical communications solution may meld the tactical radio and modern smartphone worlds, creating a solution that enables:

Powerful apps associated with modern mobile computing
Ability to communicate on military tactical networks
Low cost, so every soldier can have one One might wonder why modern smartphone features cannot be simply added to the military radios, imbuing them with improved processing power, battery life, and graphical interfaces. This is not a feasible option because military radio development cycles are much longer than commercial smartphones, due to the need to follow tedious government contracting and certification processes. By the time a military radio actually ships in production quantities, commercial smartphones have evolved several cycles and are multiple generations ahead in hardware and software technology. Alternately, in certain embodiments, commercial smartphones may be maximally leveraged with a cost and scope-reduced tactical radio.

Certain embodiments may leverage NSA CSfC cryptographic solutions or mobile security powered by separation kernel-based hypervisors.

CSfC

Launched in 2012, the NSA's Commercial Solutions for Classified (CSfC) program aims to leverage commercial off-the-shelf solutions to secure classified government networks and information. CSfC is a sharp change from the traditional approach of designing and building expensive government-purpose cryptographic communications equipment. One of the key principles of CSfC is to implement multiple independent layers of commercial cryptographic products to replace a traditional, single layer government cryptographic solution. For example, to send classified information over an open network (e.g. the Internet), the traditional government approach is to use a government-certified in-line encryptor, such as TACLANE or Talon. The encryptor contains specialized encryption hardware and software and undergoes a rigorous development and approval process (Type-1 NSA certification). Some Type-1 encryptors are orders of magnitude more expensive than commercial encryption products.

Figure 2:
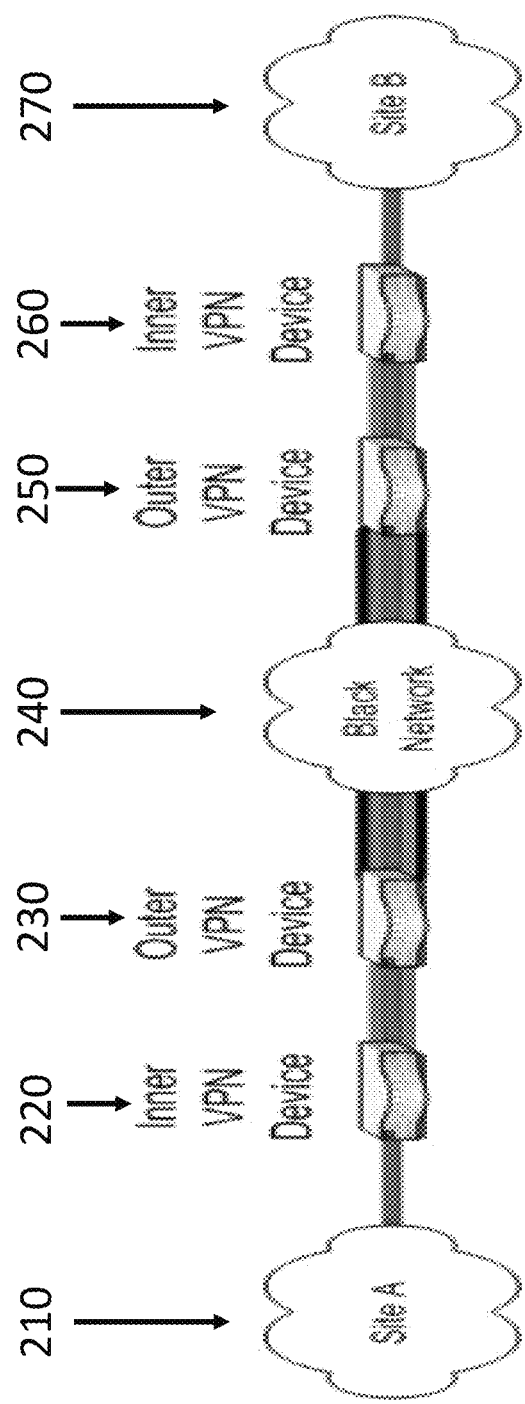
FIG. 2 illustrates a block diagram of a dual VPN architecture in accordance with certain embodiments.

An example CSfC replacement for Type-1 encryptors may utilize a dual layer VPN, as described in the CSfC program's Virtual Private Network (VPN) Capability Package. In this approach, classified information is encrypted twice, using two commercial VPNs, each of which must be certified to commercial quality standards (e.g. FIPS 140-2 certification) and supplied by different vendors. As shown in FIG. 2, Site A 210 may connect to Black or Secure Network 240 via Inner VPN Device 220 and Outer VPN Device 230 and Site B 270 may connect to Black Network 240 via Inner VPN Device 260 and Outer VPN Device 250.

The individual products used in CSfC composed solutions may be developed for the larger commercial enterprise and therefore are much lower cost and not dependent upon or subject to the same government funding and certification overhead used for traditional Type-1 systems. For example and without limitation, a dual CSfC VPN solution might be composed of standard enterprise Cisco and open source StrongSwan products.

Separation Kernel-Based Hypervisors

Commercial, off-the-shelf bare metal mobile hypervisors have been deployed in standard consumer smartphones and tablets for several years, and the USMC (via its Trusted Handheld, or TH2, program) recently took a leadership role in applying them to improve mission capability while reducing total cost of mobile computing for the government. Mobile hypervisors provide strong isolation between the mobile operating system (OS) (e.g. Android) and other execution environments (e.g. security components or even a second Android instance) that must be protected even if the Android OS itself is vulnerable and exploited by malware or remote attacks.

For example, TH2 worked with mobile hypervisor technology from Green Hills Software, whose virtualization approach leverages high assurance INTEGRITY separation kernel technology that has been deployed for many years in critical commercial embedded systems, such as medical equipment, industrial controls, and avionics. The hypervisor may enable multi-domain use of a single device as well as application of CSfC-compliant data protection.

Figure 3:
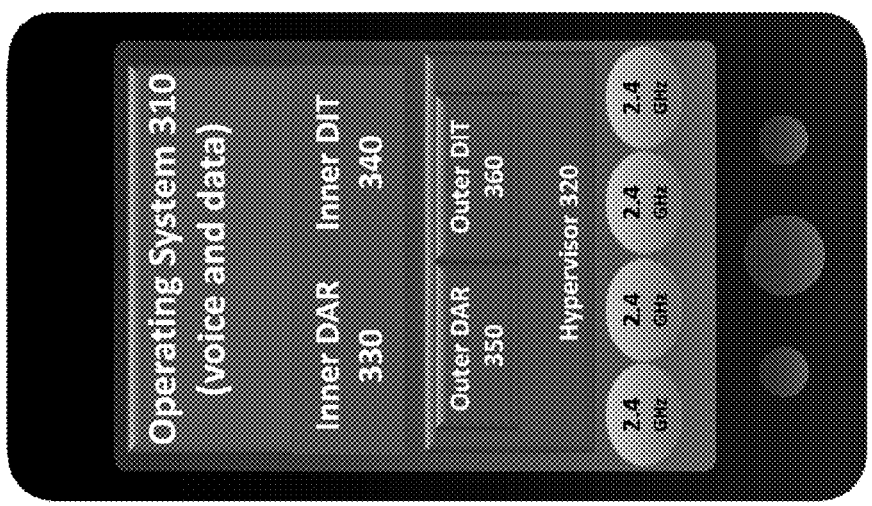
FIG. 3 illustrates a block diagram of a dual VPN architecture with a hypervisor in accordance with certain embodiments.

As shown in FIG. 3, in certain embodiments, dual layer data-at-rest (DAR) and data-in-transit (DIT) can both be implemented using a hypervisor to provide a layer of isolated security beyond the mobile operating system itself. In certain embodiments, Operating system 310 may include Inner DAR 330 and Inner DIT 340. Hypervisor 320 may include Outer DAR 350 and Outer DIT 360.

Figure 4:
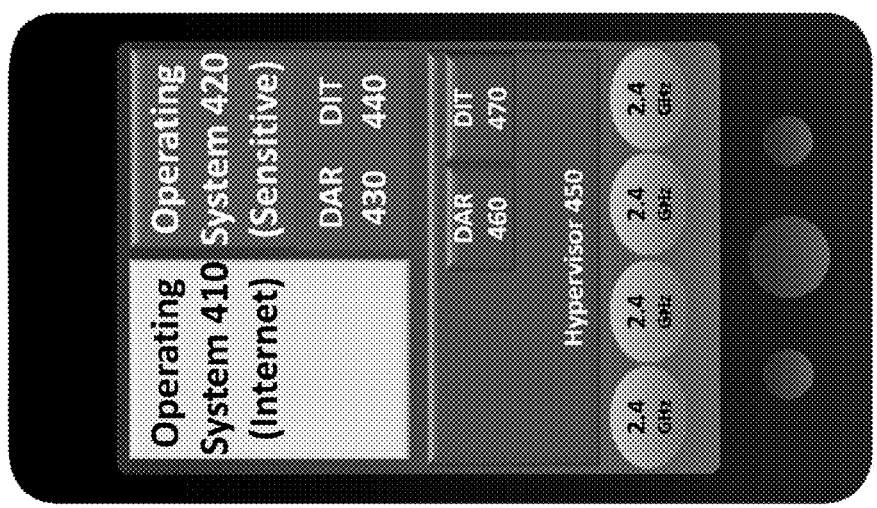
FIG. 4 illustrates a dual domain architecture in accordance with certain embodiments.

As shown in FIG. 4, in certain embodiments two instances of an operating system may be used to provide additional security. Operating System 410 may be used for non-sensitive applications, for example accessing the Internet, while operating system 420 may include DAR 430 and DIT 440 for use with more sensitive applications. Operating system 420 may be isolated from operating system 410 to protect the sensitive applications from vulnerabilities in operating system 410. In certain embodiments, the mobile device may also include hypervisor 450 with DAR 460 and DIT 470 to provide a second layer of isolated security beyond the mobile operating system 410.

Certain embodiments provide an extensible execution environment for other critical processing. Certain embodiments provide an application of this environment to offload some of the tactical radio processing onto the powerful mobile device. The mobile device may then be conjoined with a reduced footprint tactical radio to create a single unit that has the power and flexibility of the modern smartphone or tablet, yet communicates seamlessly on traditional military tactical networks.

A standard tactical military radio, such as the Rifleman, may include three main processing environments: a red side subsystem, a cryptographic subsystem, and a black side subsystem. Human voice (push-to-talk) may enter into and be processed by the red side subsystem. This data may then be encrypted by the cryptographic subsystem before it is transmitted by the black side subsystem, responsible for all link layer functions.

Figure 5:
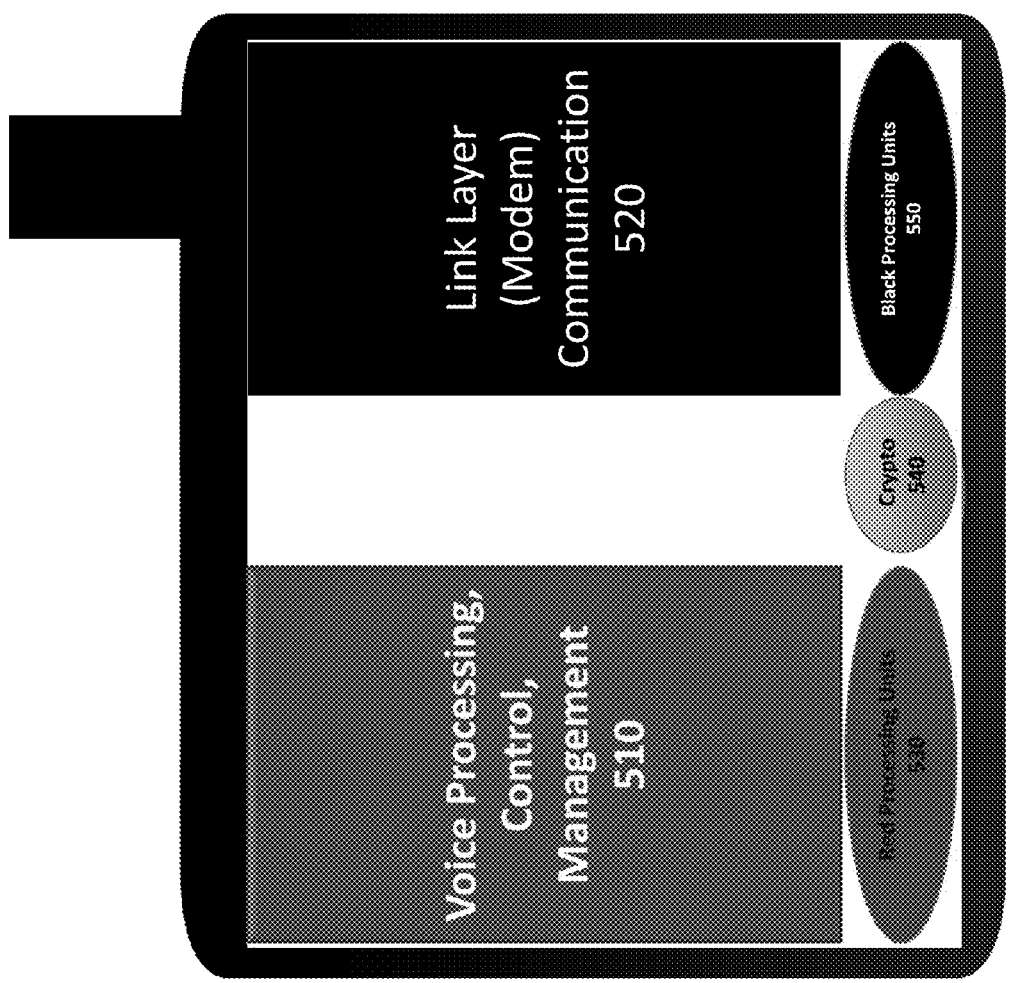
FIG. 5 illustrates a red-black radio architecture in accordance with certain embodiments.

FIG. 5 shows certain embodiments of a red-black tactical radio architecture. The red side 510 of the radio consists of hardware and software may include components that process data input (button presses, speech, etc.) and handle miscellaneous control and management processing (e.g. firmware updates and configuration changes) with one or more red processing units 530. The black side 520 of the radio consists of radio signal processing hardware and software components (typically thought of as the "modem" portion of the radio or layers two and below in an OSI stack model) with one or more black processing units 550. In certain embodiments, there may be a cryptographic subsystem 540 between the red side 510 and black side 520 that is responsible for protecting data as it transits between the red (plaintext) side 510 to the black (ciphertext) side 520.

The cryptographic subsystem may be a traditional government-purpose Type-1 component (not CSfC) and may be costly to develop and certify. The black side components may include special purpose digital signal processing hardware and algorithms that cannot be easily offloaded onto the general-purpose applications processing hardware on the mobile device. The red-side processing, however, may lend itself well to the smartphone execution environment. Furthermore, the Type-1 cryptographic subsystem may be replaced with a CSfC approach that may be developed and deployed on the smartphone.

In certain embodiments, a scope and cost-reduced tactical radio, comprising the black-side processing, while the red-side and cryptographic subsystems have been offloaded as additional software applications on a hypervisor-powered smartphone. FIG. 3 provides one exemplary non-limiting embodiment of a hypervisor-powered smartphone that may be coupled to such a simplified radio. Furthermore, because the radio hardware is so much simpler, it may be manufactured into a smaller, more flexible form factor, such as a sleeve or attachment on the smartphone itself, enabling the warfighter to carry them easily as a single unit. When the smartphone is connected to the sleeve, the smartphone's built-in communications peripherals may be disabled, and all communication may be routed to the radio. Even push-to-talk voice may be handled by the smartphone, reducing the complexity of the radio and providing the warfighter with the most modern graphical interface and application environment possible.

Figure 6:
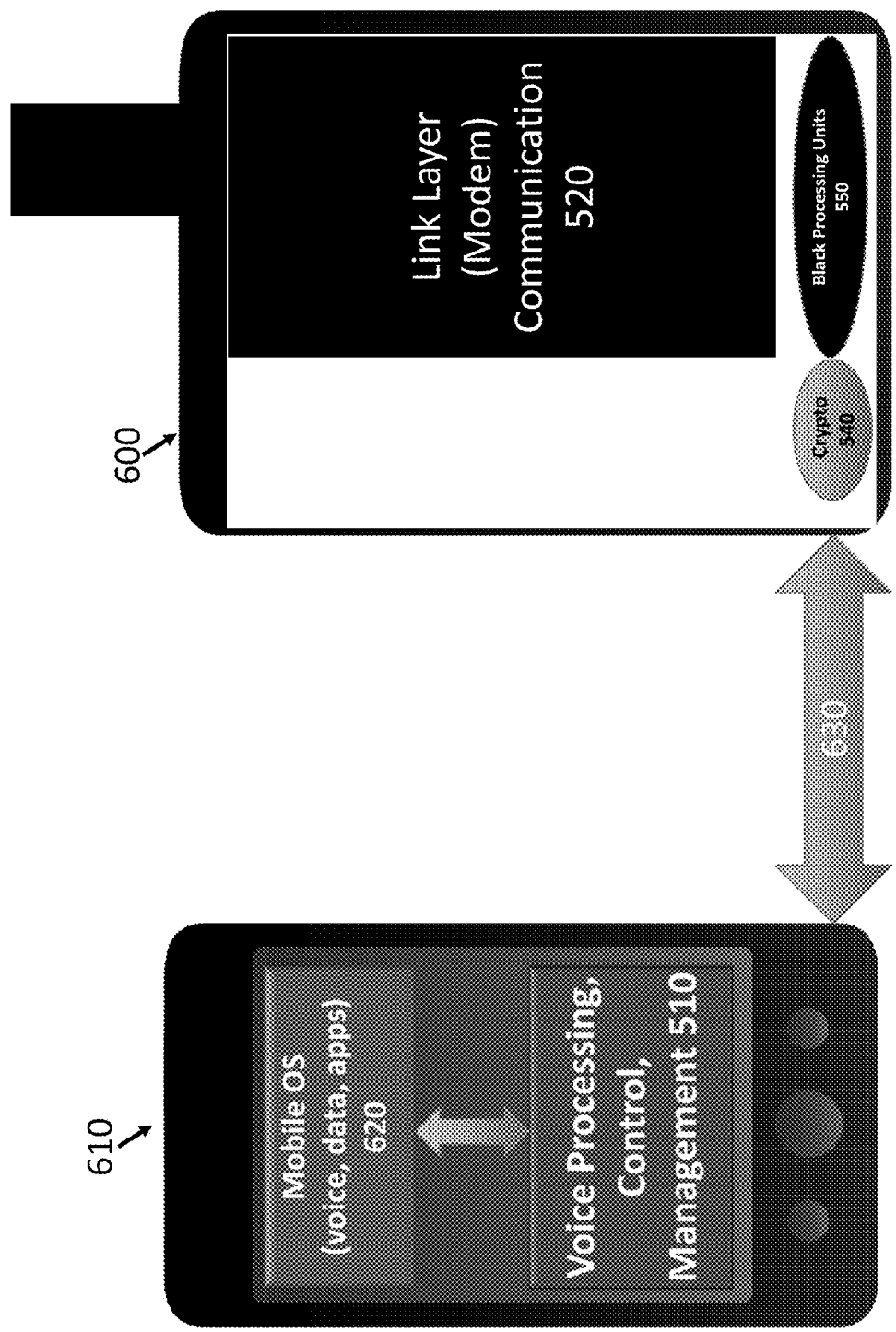
FIG. 6 illustrates a hybrid mobile device and radio architecture in accordance with certain embodiments.

As shown in FIG. 6, in certain embodiments, a military radio 600 that employs this traditional "red-black" design may be simplified by removing the red side processing 510 and re-hosting it on the mobile device 610, reducing the hardware/software complexity of the radio. The mobile device 610 is leveraged for its voice, data, and applications 620, but mobile device communications flow through red side component 510 and then through a communication connection 630 to the modified (complexity-reduced) radio 600.

Figure 7:
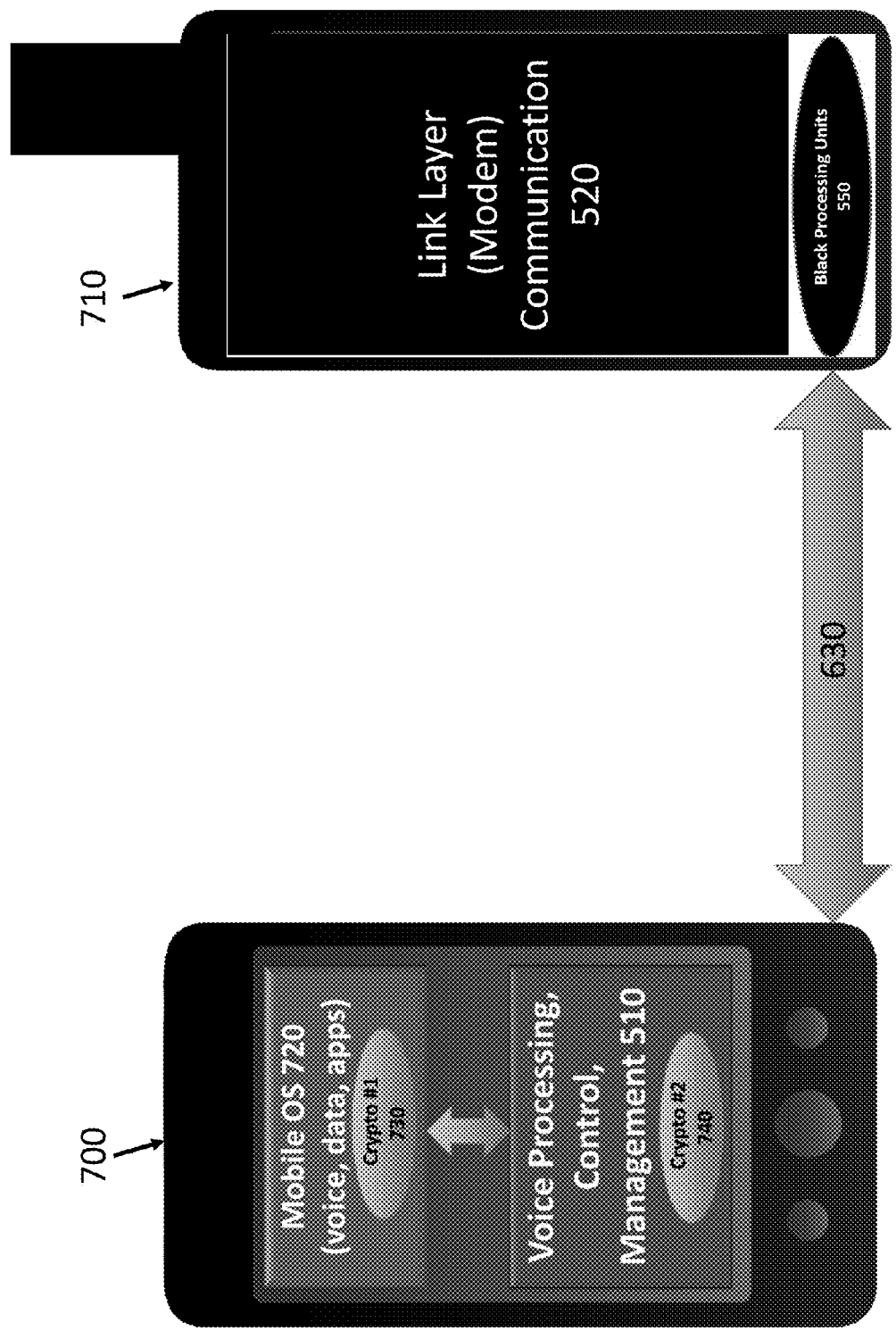
FIG. 7 illustrates a hybrid mobile device and radio architecture in accordance with certain embodiments.

As shown in FIG. 7, in certain embodiments, the cryptographic subsystem may operate on the mobile device 700, either using crypto subsystem 540 or replacing it with an analogous but different implementation. For example, replacing the military cryptographic subsystem 540 with two layers of commercial cryptographic software subsystems, Crypto #1 730 and Crypto #2 740. Other embodiments may include only subsets of the red side software on the mobile device and/or some (but not all) of the black side processing.

Figure 8:
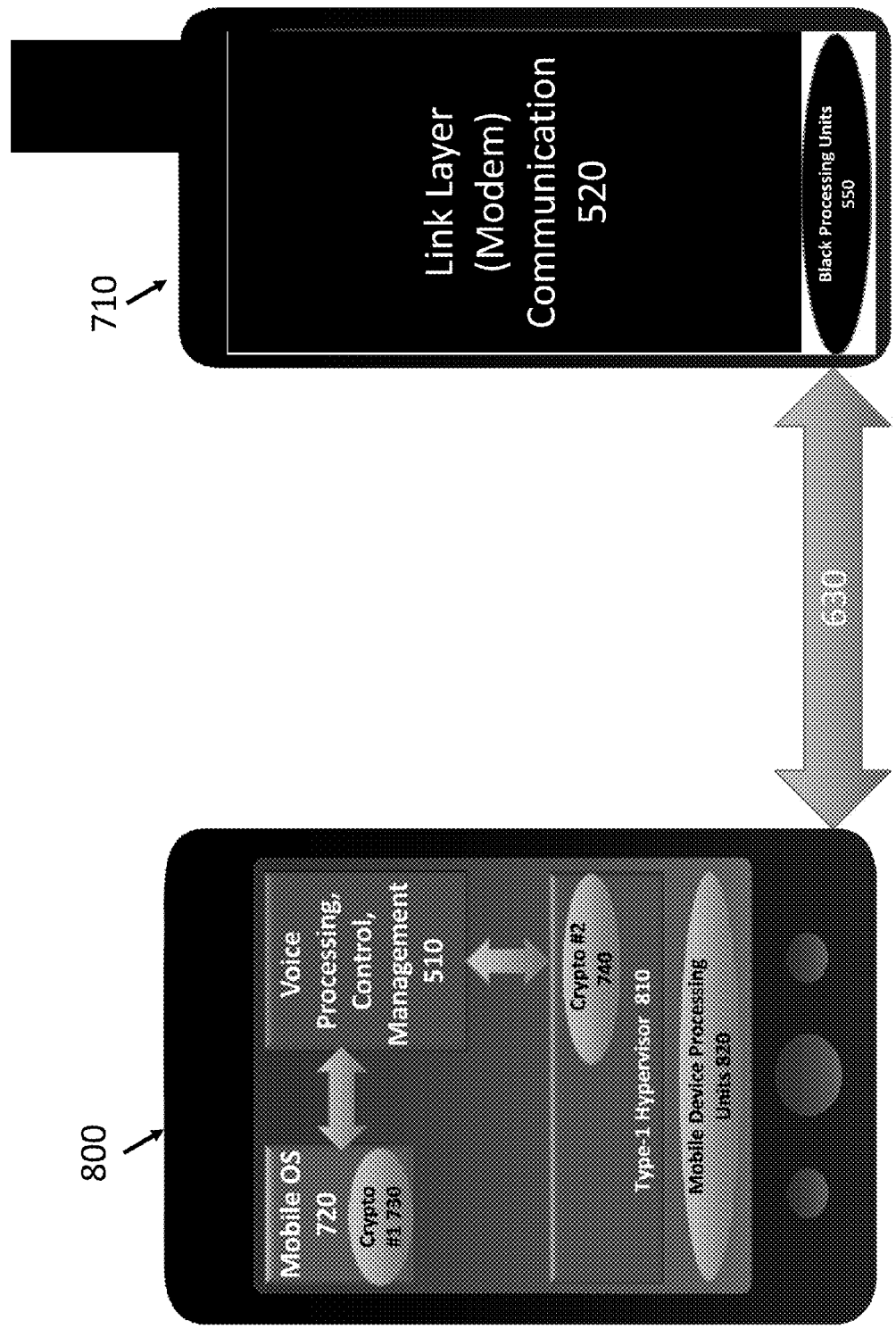
FIG. 8 illustrates a hybrid mobile device and radio architecture in accordance with certain embodiments.

As shown in FIG. 8, certain embodiments include methods for hosting certain radio components within the mobile device 800 execution environment. In certain embodiments, the software components may be ported into the existing mobile operating system 720, either as an application or within the mobile operating system's service components or within a mobile operating system-provided resource container. While this may be a straightforward method, the robustness of the hosted components may be dependent upon the robustness of the mobile operating system itself. In another embodiment, the mobile operating system may be robustly partitioned from the hosted components. Such partitioning may be implemented using software-partitioning mechanisms that do not require any hardware changes to the mobile device itself. Software partitioning may be implemented using TrustZone (an ARM microprocessor feature), a Type-2 hypervisor, or a Type-1 hypervisor. FIG. 8 depicts a Type-1 hypervisor embodiment, wherein a secure and trusted hypervisor controls the mobile device microprocessor 820 and hosts isolated domains containing one or more mobile operating system 720 instances and the hosted radio components, such as red side components 510, and may control the flow of information between these domains.

Figure 9:
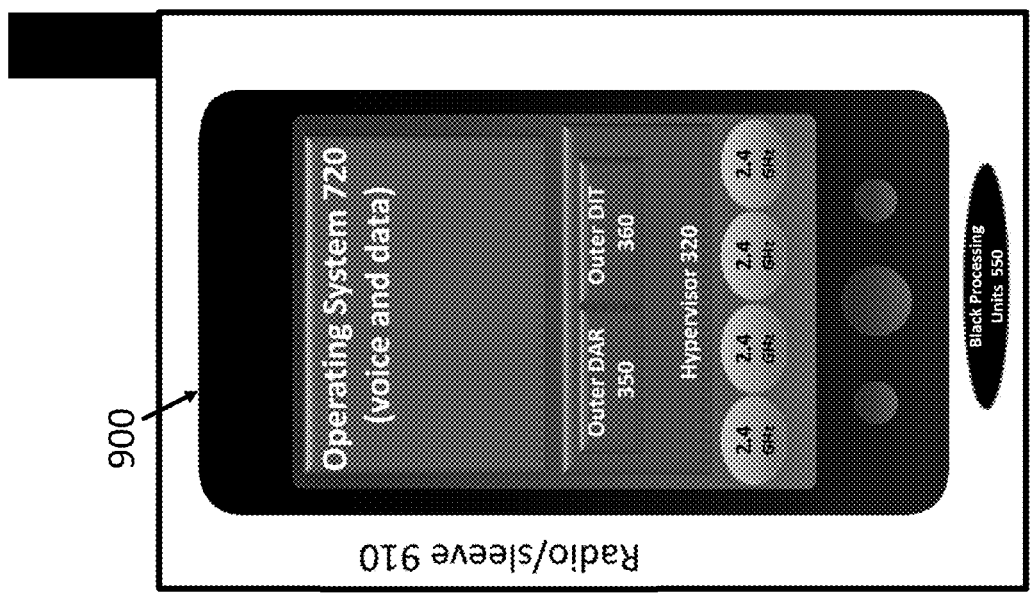
FIG. 9 illustrates a conjoined mobile device with offloaded radio functions and a cost-reduced tactical radio sleeve in accordance with certain embodiments.
Figure 10:
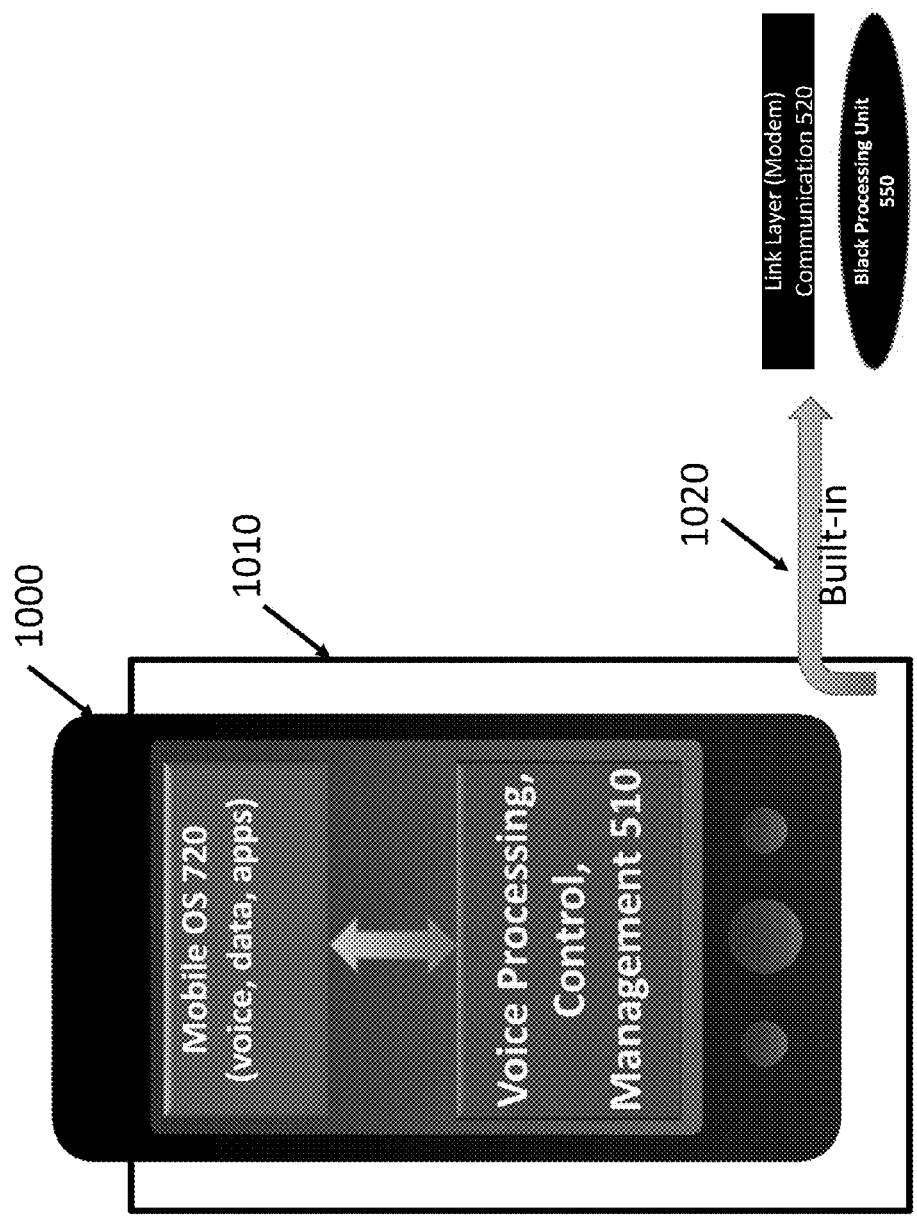
FIG. 10 illustrates a tactical mobile radio built as a sleeve and a mobile device coupled by a connector not visible to the user in accordance with certain embodiments.

As shown in FIG. 9, because the radio hardware is so much simpler, it may be manufactured into a smaller, more flexible form factor, such as a sleeve or attachment on the smartphone itself, enabling the warfighter to carry them easily as a single unit. When the smartphone 900 is connected to the sleeve 910, the smartphone's built-in communications peripherals may be disabled, and all communication may be routed to the radio 910. Even push-to-talk voice may be handled by the smartphone 900, reducing the complexity of the radio 910 and providing the warfighter with the most modern graphical interface and application environment possible. As shown in FIG. 10, the sleeve 1010 and mobile device 1000 may be connected by a USB adapter or other connector 1020 that is hidden from the user with no visible cable when the sleeve 1010 and mobile device 1000 are connected.

In certain embodiments, a computing device configured for secure communications is disclosed, comprising: an operating system; a secure partition separate from the operating system; a software-defined radio module installed in the secure partition; wherein the software-defined radio module is configured to connect to a radio device external to the computing device for secure communications. The software-defined radio module may include a data processing algorithm for secure communications via the radio device. The software-defined radio module may include a vocoder configured for secure communications via the radio device. The software-defined radio module is configured to operate with the software communications architecture (SCA) core framework and CORBA orb. The computing device may further include: a plaintext red side module; a ciphertext black side module; and a cryptographic subsystem for protecting data transiting between the red side module and the black side module. At least a portion of the red side module may be hosted on the software-defined radio module. The red side module may be hosted on the software-defined radio module. The cryptographic subsystem may be hosted on the software-defined radio module. The cryptographic subsystem may include an NSA Type-1 certified, government-purpose cryptographic subsystem. The cryptographic subsystem may include at least two independent layers of commercial, off-the-shelf cryptographic subsystems. The software-defined radio module may include an encryption module for encrypting communications for transmission via the external radio device and decrypting communications received from the radio device.

In certain embodiments, a device pair configured for secure communications is disclosed, comprising: a computing device comprising: an operating system; a secure partition separate from the operating system; a software-defined radio module installed in the secure partition; a radio device; and at least one communication connection between the radio device and the computing device. The computing device may be a mobile device. The software-defined radio module may include a data processing algorithm for secure communications via the radio device. The software-defined radio module is configured to operate with the software communications architecture (SCA) core framework and CORBA orb. The software-defined radio module may include an encryption module for encrypting communications for transmission via the external radio device and decrypting communications received from the radio device. The device pair may further include: a plaintext red side module; a ciphertext black side module; and a cryptographic subsystem for protecting data transiting between the red side module and the black side module. At least a portion of the red side module may be hosted on the software-defined radio module. The red side module may be hosted on the software-defined radio module. The cryptographic subsystem may be hosted on the software-defined radio module. The cryptographic subsystem may include an NSA Type-1 certified, government-purpose cryptographic subsystem. The cryptographic subsystem may include at least two independent layers of commercial, off-the-shelf cryptographic subsystems. The radio device may be configured to act as a sleeve to hold the computing device, to permit the device pair to be carried as a single unit. The sleeve may ruggedize the device pair. The sleeve may provide anti-tamper capability to the device pair. The sleeve may be configured to attach to the computing device via a connection that is not visible when the sleeve is connected to the computing device. The connection may include a selected one of a USB connection, a firewire connection and a custom wired connection. The radio device and the computing device may be rendered useless if someone attempts to break into the device pair. The radio device may be configured to attach to the back of the computing device. The at least one communication connection may include a wireless connection. The at least one communication connection may include a selected one of a Bluetooth connection and a NFC connection.

In certain embodiments, a method for secure communications is disclosed, comprising: receiving first encrypted data at a radio device; transferring the first encrypted data via a communications connection to a computing device; and decrypting the first encrypted data into plaintext data for use on the computing device; wherein the computing device may include: an operating system; a secure partition separate from the operating system; and a software-defined radio module installed in the secure partition. The method may further include: encrypting plaintext data on the mobile device to create second encrypted data; transferring the second encrypted data from the computing device to the radio device; and transmitting the second encrypted data from the radio device. The computing device may include a mobile device. The step of encrypting may be performed by an encryption module running as an application under an operating system of the computing device. The step of encrypting may be performed within one or more containers of an operating system of the computing device. The step of encrypting may be performed within a second operating system instance, atop a Type-2 hypervisor. The step of encrypting may be performed within a second operating system instance, atop a Type-1 hypervisor. The step of encrypting may be performed as a native application on top of the Type-1 hypervisor, without the need for a full operating system instance. The step of encrypting may be performed as a native application within a trusted execution environment. The software-defined radio module may include a data processing algorithm for secure communications via the radio device. The software-defined radio module may be configured to operate with the software communications architecture (SCA) core framework and CORBA orb. The software-defined radio module may include an encryption module for encrypting communications for transmission via the external radio device and decrypting communications received from the radio device. The method may further include: a plaintext red side module; a ciphertext black side module; and a cryptographic subsystem for protecting data transiting between the red side module and the black side module. The at least a portion of the red side module may be hosted on the software-defined radio module. The red side module may be hosted on the software-defined radio module. The cryptographic subsystem may be hosted on the software-defined radio module. The cryptographic subsystem may include an NSA Type-1 certified, government-purpose cryptographic subsystem. The cryptographic subsystem may include at least two independent layers of commercial, off-the-shelf cryptographic subsystems. The radio device may be configured to act as a sleeve to hold the computing device, to permit the device pair to be carried as a single unit. The sleeve may ruggedize the device pair. The sleeve may provide anti-tamper capability to the device pair. The sleeve may be configured to attach to the computing device via a connection that is not visible when the sleeve is connected to the computing device. The connection may include a selected one of a USB connection, a firewire connection and a custom wired connection. The radio device and the computing device may be rendered useless if someone attempts to break into the device pair. The radio device may be configured to attach to the back of the computing device. The at least one communication connection may include a wireless connection. The at least one communication connection may include a selected one of a Bluetooth connection and a NFC connection.

In certain embodiments, a method of hosting radio subsystems on a mobile device is disclosed, comprising: hosting at least one radio subsystem from a radio device on a mobile device in a secure partition separate from a mobile operating system; wherein the at least one radio subsystem may include at least one of (a) a plaintext red side module; (b) a ciphertext black side module; (c) a cryptographic subsystem for protecting data transiting between the red side module and the black side module; (d) a data processing algorithm for secure communications via an external radio device; and (e) a vocoder configured for secure communications via the radio device. The method may further include running the hosted at least one radio subsystem as applications on top of a mobile operating system of the mobile device. The method may further include running the hosted at least one radio subsystem within one or more containers of a mobile operating system of the mobile device. The method may further include running the hosted at least one radio subsystem within a second mobile operating system instance, atop a Type-2 hypervisor. The method may further include running the hosted at least one radio subsystem within a second mobile operating system instance, atop a Type-1 hypervisor. The method may further include running the hosted at least one radio subsystem as native applications on top of the Type-1 hypervisor, without the need for a full mobile operating system instance. The method may further include running the hosted at least one radio subsystem as native applications within a trusted execution environment. The trusted execution environment may be created and isolated using ARM TrustZone technology. The computing device may further include: a software-defined radio module installed in the secure partition; wherein the at least one radio subsystem is hosted in the software-defined radio module. The software-defined radio module may include a data processing algorithm for secure communications via the radio device. The software-defined radio module may include a vocoder configured for secure communications via the radio device. The software-defined radio module may be configured to operate with the software communications architecture (SCA) core framework and CORBA orb. At least a portion of the red side module is hosted on the software-defined radio module. The red side module may be hosted on the software-defined radio module. The cryptographic subsystem may be hosted on the software-defined radio module. The cryptographic subsystem may include an NSA Type-1 certified, government-purpose cryptographic subsystem. The cryptographic subsystem may include at least two independent layers of commercial, off-the-shelf cryptographic subsystems. The software-defined radio module may include an encryption module for encrypting communications for transmission via the external radio device and decrypting communications received from the radio device.

The software defined radio may include one or more of the following components: (1) data processing algorithms including but not limited to a vocoder, frequency hopping, etc.; (2) audit logging, statistics, etc.; (3) middleware components; (4) a call controller for establishing and tearing down calls; (5) one or more cryptographic subsystems; (6) networking software (e.g. IP, routing protocols); and (7) one or more radio management components (e.g. SNMP, custom management protocols). Middleware components may include without limitation examples for US military application including the software communications architecture (SCA) core framework and CORBA orb.

While the above description contains many specifics, these should not be construed as limitations on the scope of the invention, but rather as an exemplification of certain embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

I claim:

1. A computing device configured for secure communications, comprising:
    an operating system;
    a secure partition separate from the operating system;
    a software-defined radio module installed in the secure partition;
    wherein the software-defined radio module is configured to connect to a radio device external to the computing device for secure communications;
    wherein the software-defined radio module is configured for voice processing for secure communications via the radio device;
    wherein a cryptographic subsystem is hosted on the software-defined radio module; and
    wherein the cryptographic subsystem comprises at least two independent layers of commercial, off-the-shelf cryptographic subsystems.

2. The computing device of claim 1, wherein the software-defined radio module comprises a data processing algorithm for secure communications via the radio device.

3. The computing device of claim 1, wherein the software-defined radio module comprises a vocoder configured for secure communications via the radio device.

4. The computing device of claim 1, wherein the software-defined radio module is configured to operate with the software communications architecture (SCA) core framework and Common Object Request Broker Architecture (CORBA) orb.

5. The computing device of claim 1, further comprising:
    a plaintext red side module;
    a ciphertext black side module; and
    a cryptographic subsystem for protecting data transiting between the red side module and the black side module.

6. The computing device of claim 1, wherein at least a portion of the red side module is hosted on the software-defined radio module.

7. The computing device of claim 1, wherein the red side module is hosted on the software-defined radio module.

8. The computing device of claim 1, wherein the cryptographic subsystem comprises an NSA Type-1 certified, government-purpose cryptographic subsystem.

9. The computing device of claim 1, wherein the software-defined radio module comprises an encryption module for encrypting communications for transmission via the external radio device and decrypting communications received from the radio device.

10. A device pair configured for secure communications, comprising:
    a computing device comprising:
        an operating system;
        a secure partition separate from the operating system;
        a software-defined radio module installed in the secure partition;
        a cryptographic subsystem hosted on the software-defined radio module;
        wherein the cryptographic subsystem comprises at least two independent layers of commercial, off-the-shelf cryptographic subsystems;
    a radio device; and
    at least one communication connection between the radio device and the computing device.

11. The device pair of claim 10, wherein the computing device is a mobile device.

12. The device pair of claim 10, wherein the software-defined radio module comprises a data processing algorithm for secure communications via the radio device.

13. The device pair of claim 10, wherein the software-defined radio module is configured to operate with the software communications architecture (SCA) core framework and Common Object Request Broker Architecture (CORBA) orb.

14. The device pair of claim 10, wherein the software-defined radio module comprises an encryption module for encrypting communications for transmission via the external radio device and decrypting communications received from the radio device.

15. The device pair of claim 10, further comprising:
    a plaintext red side module; and
    a ciphertext black side module;
    wherein the cryptographic subsystem is configured for protecting data transiting between the red side module and the black side module.

16. The device pair of claim 15, wherein at least a portion of the red side module is hosted on the software-defined radio module.

17. The device pair of claim 15, wherein the red side module is hosted on the software-defined radio module.

18. The device pair of claim 15, wherein the cryptographic subsystem comprises an NSA Type-1 certified, government-purpose cryptographic subsystem.

19. The device pair of claim 15, wherein the radio device is configured to act as a sleeve to hold the computing device, to permit the device pair to be carried as a single unit.

20. The device pair of claim 19, wherein the sleeve ruggedizes the device pair.

21. The device pair of claim 19, wherein the sleeve provides anti-tamper capability to the device pair.

22. The device pair of claim 19, wherein the sleeve is configured to attach to the computing device via a connection that is not visible when the sleeve is connected to the computing device.

23. The device pair of claim 19, wherein the connection comprises a selected one of a USB connection, a firewire connection and a custom wired connection.

24. The device pair of claim 19, wherein the radio device and the computing device are rendered useless if someone attempts to break into the device pair.

25. The device pair of claim 15, wherein the radio device is configured to attach to the back of the computing device.

26. The device pair of claim 15, wherein at least one communication connection comprises a wireless connection.

27. The device pair of claim 26, wherein at least one communication connection comprises a selected one of a Bluetooth connection and a NFC connection.

28. A method for secure communications, comprising:
receiving first encrypted data at a radio device;
transferring the first encrypted data via a communications connection to a computing device; and
decrypting the first encrypted data into plaintext data for use on the computing device;
wherein the computing device comprises:
an operating system;
a secure partition separate from the operating system;
a software-defined radio module installed in the secure partition; and
a cryptographic subsystem hosted on the software-defined radio module;
wherein the cryptographic subsystem comprises at least two independent layers of commercial, off-the-shelf cryptographic subsystems.

29. The method of claim 28, further comprising:
encrypting plaintext data on the mobile device to create second encrypted data;
transferring the second encrypted data from the computing device to the radio device; and
transmitting the second encrypted data from the radio device.

30. The method of claim 28, wherein the computing device comprises a mobile device.

31. The method of claim 28, wherein the step of encrypting is performed by an encryption module running as an application under an operating system of the computing device.

32. The method of claim 28, wherein the step of encrypting is performed within one or more containers of an operating system of the computing device.

33. The method of claim 28, wherein the step of encrypting is performed within a second operating system instance, atop a Type-2 hypervisor.

34. The method of claim 28, wherein the step of encrypting is performed within a second operating system instance, atop a Type-1 hypervisor.

35. The method of claim 34, wherein the step of encrypting is performed as a native application on top of the Type-1 hypervisor, without the need for a full operating system instance.

36. The method of claim 28, wherein the step of encrypting is performed as a native application within a trusted execution environment.

37. The method of claim 28, wherein the software-defined radio module comprises a data processing algorithm for secure communications via the radio device.

38. The method of claim 28, wherein the software-defined radio module is configured to operate with the software communications architecture (SCA) core framework and Common Object Request Broker Architecture (CORBA) orb.

39. The method of claim 28, wherein the software-defined radio module comprises an encryption module for encrypting communications for transmission via the external radio device and decrypting communications received from the radio device.

40. The method of claim 28, further comprising:
a plaintext red side module; and
a ciphertext black side module;
wherein the cryptographic subsystem is configured for protecting data transiting between the red side module and the black side module.

41. The method of claim 28, wherein at least a portion of the red side module is hosted on the software-defined radio module.

42. The method of claim 28, wherein the red side module is hosted on the software-defined radio module.

43. The method of claim 28, wherein the cryptographic subsystem is hosted on the software-defined radio module.

44. The method of claim 28, wherein the cryptographic subsystem comprises an NSA Type-1 certified, government-purpose cryptographic sub system.

45. The method of claim 28, wherein the radio device is configured to act as a sleeve to hold the computing device, to permit the device pair to be carried as a single unit.

46. The method of claim 28, wherein the sleeve ruggedizes the device pair.

47. The method of claim 28, wherein the sleeve provides anti-tamper capability to the device pair.

48. The method of claim 28, wherein the sleeve is configured to attach to the computing device via a connection that is not visible when the sleeve is connected to the computing device.

49. The method of claim 28, wherein the connection comprises a selected one of a USB connection, a firewire connection and a custom wired connection.

50. The method of claim 28, wherein the radio device and the computing device are rendered useless if someone attempts to break into the device pair.

51. The method of claim 28, wherein the radio device is configured to attach to the back of the computing device.

52. The method of claim 28, wherein at least one communication connection comprises a wireless connection.

53. The method of claim 28, wherein at least one communication connection comprises a selected one of a Bluetooth connection and a NFC connection.

54. A method of hosting radio subsystems on a mobile device, comprising:
hosting at least one radio subsystem from a radio device on a mobile device in a secure partition separate from a mobile operating system;
wherein the at least one radio subsystem comprises at least one of (a) a plaintext red side module; (b) a ciphertext black side module; (c) a cryptographic subsystem for protecting data transiting between the red side module and the black side module; (d) a data processing algorithm for secure communications via an external radio device; and (e) a voice processing module configured for secure communications via the radio device;

wherein the mobile device comprises a software-defined radio module installed in the secure partition;

wherein the at least one radio subsystem is hosted in the software-defined radio module;

wherein the cryptographic subsystem is hosted on the software-defined radio module; and wherein the cryptographic subsystem comprises at least two independent layers of commercial, off-the-shelf cryptographic subsystems.

55. The method of claim 54, further comprising running the hosted at least one radio subsystem as applications on top of a mobile operating system of the mobile device.

56. The method of claim 54, further comprising running the hosted at least one radio subsystem within one or more containers of a mobile operating system of the mobile device.

57. The method of claim 54, further comprising running the hosted at least one radio subsystem within a second mobile operating system instance, atop a Type-2 hypervisor.

58. The method of claim 54, further comprising running the hosted at least one radio subsystem within a second mobile operating system instance, atop a Type-1 hypervisor.

59. The method of claim 58, further comprising running the hosted at least one radio subsystem as native applications on top of the Type-1 hypervisor, without the need for a full mobile operating system instance.

60. The method of claim 54, further comprising running the hosted at least one radio subsystem as native applications within a trusted execution environment.

61. The method of claim 60, wherein the trusted execution environment is created and isolated using ARM technology.

62. The method of claim 54, wherein the software-defined radio module comprises a data processing algorithm for secure communications via the radio device.

63. The method of claim 54, wherein the software-defined radio module comprises a vocoder configured for secure communications via the radio device.

64. The method of claim 54, wherein the software-defined radio module is configured to operate with the software communications architecture (SCA) core framework and Common Object Request Broker Architecture (CORBA) orb.

65. The method of claim 54, wherein at least a portion of the red side module is hosted on the software-defined radio module.

66. The method of claim 54, wherein the red side module is hosted on the software-defined radio module.

67. The method of claim 54, wherein the cryptographic subsystem is hosted on the software-defined radio module.

68. The method of claim 54, wherein the cryptographic subsystem comprises an NSA Type-1 certified, government-purpose cryptoaraphic subsystem.

69. The method of claim 54, wherein the software-defined radio module comprises an encryption module for encrypting communications for transmission via the external radio device and decrypting communications received from the radio device.

* * * * *